(12) United States Patent
McAlister

(10) Patent No.: US 6,712,558 B2
(45) Date of Patent: Mar. 30, 2004

(54) ICE COMPOSITE BODY AND PROCESS FOR THE CONSTRUCTION THEREOF

(76) Inventor: Padraig McAlister, 6 Cedar Walk, Raheny, Dublin 5 (IE)

(*) Notice: Subject to any disclaimer, the term of this patent is extended or adjusted under 35 U.S.C. 154(b) by 0 days.

(21) Appl. No.: 10/311,074

(22) PCT Filed: Jun. 7, 2001

(86) PCT No.: PCT/IE01/00077

§ 371 (c)(1),
(2), (4) Date: Dec. 12, 2002

(87) PCT Pub. No.: WO01/96668

PCT Pub. Date: Dec. 20, 2001

(65) Prior Publication Data

US 2003/0223820 A1 Dec. 4, 2003

(30) Foreign Application Priority Data

Jun. 16, 2000 (IE) .......................... 2000/0490

(51) Int. Cl.⁷ .............................. E02D 19/14
(52) U.S. Cl. .................... 405/217; 405/195.1
(58) Field of Search ................ 405/217, 130, 405/211, 203, 195.1

(56) References Cited

U.S. PATENT DOCUMENTS

| | | | | |
|---|---|---|---|---|
| 3,738,114 A | * | 6/1973 | Bishop | 405/217 |
| 4,055,052 A | * | 10/1977 | Metge | 405/217 |
| 4,187,039 A | * | 2/1980 | Jahns et al. | 405/217 |
| 4,242,012 A | * | 12/1980 | Utt | 405/217 |
| 4,431,346 A | * | 2/1984 | Husebye | 405/217 |
| 4,456,072 A | | 6/1984 | Bishop | |
| 4,634,315 A | | 1/1987 | Owen et al. | |
| 6,099,208 A | | 8/2000 | McAlister | |

FOREIGN PATENT DOCUMENTS

| | | |
|---|---|---|
| EP | 0 009 986 A | 4/1980 |
| GB | 2 071 295 A | 9/1981 |
| WO | WO-97 25483 A | 7/1997 |

* cited by examiner

*Primary Examiner*—Frederick L. Lagman
(74) *Attorney, Agent, or Firm*—Fulbright & Jaworski L.L.P.

(57) ABSTRACT

An ice composite body (10) has an inner ice core (11) and a protective outer armour shell (12). The outer armour shell (12) consists of a base section (13), side sections (14) and a separate top section (15), which is free to move vertically between the side sections (14). The inner ice core (11) is maintained in a frozen condition in use by refrigeration pipes (21), which are located at various levels therethrough. The inner ice core (11) is built up from thin layers of ice which are frozen one after the other. Following the freezing of each layer of ice the layer is rolled using a roller apparatus which provides a roller pressure in the range of 3.5 to 8 Newtons/mm². The ice composite body (10) can be used in warm or cool waters for applications such as bridges, breakwaters, causeways, pontoons, artificial islands, dams, tidal barrages, wave power barrages, harbour walls, wind power farms or aircraft runways.

45 Claims, 7 Drawing Sheets

ICE COMPOSITE BODY AND PROCESS FOR THE CONSTRUCTION THEREOF

This application is a 371 of PCT/IE01/00077 filed Jun. 7, 2001.

TECHNICAL FIELD

This invention relates to ice composite bodies for use in the construction of fixed or floating structures located in or on water. The invention also relates to a process for the construction of such ice composite bodies.

BACKGROUND ART

Ice composite bodies can be used in warm or cool waters for applications such as bridges, breakwaters, causeways, pontoons, artificial islands, dams, tidal barrages, wave power barrages, harbour walls, wind power farms or aircraft runways.

GB-A 2 071 295 discloses a method of producing a gravity ice platform, made in a floating flexible mould from a spray of ice flakes or chips, which are frozen in solid ice by using supercooled water, cold air or a freezing mixture. The resultant large blocks of ice can be used on their own or a number of the blocks may be joined together to form a desired structure. Because of the large volumes of ice involved these structures will sit stably on the waterbed and are capable of withstanding any forces to which they may be subjected, such as from waves, wind currents or collisions.

A problem with structures of this kind is that the ice will tend to creep when subjected to heavy loading. The method of producing the ice structures will also result in large quantities of dissolved gas and also liquid inclusions being trapped in the ice. This will cause the ice to be unstable under stress.

WO 97/25483 discloses an ice composite body having an inner ice core covered by a protective outer armour layer with means for thermally insulating the ice core therebetween. The ice core is frozen and maintained in the frozen state by means of a system of refrigeration pipes located within the body. The ice composite body provides structures of equal or greater strength than equivalent structures using conventional materials, at a significantly lower cost. However, the strength of the ice composite body is limited by the structure of the outer armour shell. A load acting at a point on the upper surface of the armour shell will tend to cause the surface to bend causing stress in the body.

It is an object of the present invention to provide an ice composite body in which the above cited disadvantages are reduced or eliminated. It is also an object of the present invention to provide a process for the construction of an ice composite body, which will produce an ice composite body having predictable load bearing characteristics.

DISCLOSURE OF INVENTION

Thus, according to the present invention there is provided an ice composite body for use in the construction of fixed or floating structures located in or on water, the body comprising an inner ice constrained core, a protective outer armour shell having side sections and a separate top section, the top section resting freely between the side sections on the ice core in use and being free to move vertically in use, such that any load acting on the top section will be evenly distributed through the body, means for thermally insulating the ice core and means for maintaining the ice core in a frozen condition in use.

As the inner ice core is constrained within the outer armour shell and as the top section rests on the ice core, the ice core is only stressed in compression. This results in an increase in safe design strength relative to known ice composite bodies.

Preferably, the protective outer armour shell has an inner wall and an outer wall with a space therebetween, the space providing the means for thermally insulating the ice core.

Further, preferably, the space is filled with foam insulating material.

The space between the walls provides a degree of insulation on its own but may also be filled with insulating material.

In certain embodiments, strengthening ribs are located at intervals between the inner and outer walls.

The orientation of the strengthening ribs can be chosen depending on the particular application for which the ice composite body is to be used. Thus, where the application is for a road bridge or aircraft runway the strengthening ribs can be orientated along the length of the bridge or runway so as to be located under the wheel track of the vehicles in use, with suitable lateral stiffeners placed between the ribs.

Preferably, the protective outer armour shell has a base section, side sections, and the top section is located between the side sections and is free to move therebetween.

Thus, the top section rests freely on the ice core in use and is free to move in a vertical direction between the side sections while being retained therebetween. The side sections do not bear any of the weight of the top section.

Further, preferably, one of the side sections further comprises a separate closure section removably located on the upper edge thereof, the closure section being located on the side section in use once the top section is in position.

The removable closure section facilitates the construction of the ice composite body. Thus, the top section can be positioned on the inner ice core with the closure section being put in place on the upper edge of the side section thereafter. The top section is then retained between the two side sections.

Suitably, the space between the top section and the side sections contains a filler material, which prevents any of the core ice from entering the space in use.

The filler provides lateral support and also ensures that the top section always exerts its weight vertically on the ice core top.

Preferably, the filler material is an elastomer or an elastomer-modified bitumen.

To ensure that the top section will always exert its weight vertically on the ice core, the filler material should be chosen from materials such as an elastomer or elastomer-modified bitumen with slightly higher strain in shear at the operating conditions of the ice composite body than the compression strain of the ice under the top section loading and having good adhesion to the armour material chosen.

The filler material is also chosen with reference to the width and vertical dimension of the space between the top section and the side sections, so that the adhesion of the filler to and yield shear stress along the armour used, multiplied by the vertical dimension of the space, is greater than the normal compressive loading on the ice in use.

Further, preferably, a stuffing gasket is located at the upper end of the space between the top section and the side sections to limit the loss of filler therefrom.

In use, the stuffing gasket will be depressed into the space by applied pressure or surface traffic pressure, in order to minimise the expression rate of the filler.

Suitably, the ice composite body is provided with means for replacing any filler lost from the space.

Thus, replacement filler can be pumped into the space at a pressure equal to the compression stress on the top of the ice so as to prevent ice from entering into the space and to ensure that the space is always full of filler.

Preferably, the protective outer armour layer is made of concrete material.

Concrete has been found to be a suitable material for structures constantly immersed in water and provides a life span for the ice composite body of over seventy years when suitably constructed.

Preferably, the inner ice core is formed in layers, each layer having been rolled using a roller apparatus which provides a roller pressure in the range of 3.5 to 8 Newtons/mm$^2$ following formation thereof.

The rolling is carried out in order to orient the strongest axes of the ice crystals of the ice formed in the desired direction. The roller apparatus should exert a compressive pressure above that of the weak ice crystals and below that of the strong ice crystals, typically a roller pressure in the range 3.5–8 Newtons/mm$^2$, with the choice of roller pressure being determined by the particular core strength desired by the designer. This rolling process converts the crystal structure in each ice layer into one with the required mix of strong crystals of known orientation and compressive strength. The rolling of the ice layers in this way also ensures that any average load applied to the top section in use that is below the pressure of the roller used, can be safely withstood by the finished ice core.

Suitably, the means for maintaining the ice core in a frozen condition in use is a plurality of refrigeration pipes passing through the ice core, the refrigeration pipes being connected to a refrigeration unit.

The use of a plurality of refrigeration pipes means that all sections of the inner ice core can be maintained at the desired temperature by suitably distributing the pipes therethrough.

Preferably, the plurality of refrigeration pipes is arranged in parallel groups at various levels throughout the ice core.

Further, preferably, adjacent groups of refrigeration pipes lie at an angle relative to each other.

Advantageously, adjacent groups of refrigeration pipes lie at right angles to each other.

Preferably, a parallel group of refrigeration pipes is located between each layer of ice.

The arrangement of the refrigeration pipes in parallel in groups between each layer of ice with adjacent groups at right angles is an efficient way of controlling the temperature of the ice core and also has advantages as regards the initial formation of the ice core.

Preferably, the plurality of refrigeration pipes includes a set of parallel pipes along the inner wall of each side section.

Having a set of parallel pipes along each wall makes it easier to maintain the ice core at the desired temperature.

In one embodiment the refrigeration unit is located within the space between the inner and outer walls of the protective armour shell.

Placing the refrigeration unit in the space between the inner and outer walls means that the unit can be easily accessed while being protected from the elements.

Preferably, each refrigerant pipe passes through opposing inner walls of the side sections of the protective armour layer and is secured within the space between the inner and outer walls.

By fixing the pipes in this fashion they can add transverse strength to the ice composite body.

Further, preferably, the temperature of individual refrigerant pipes can be controlled independently.

Thus, by controlling the temperature of particular pipes, the temperature of a specific area within the ice core can be altered relative to the surrounding ice.

If a particular area of the interior of the ice composite body needs to be inspected, for example, by a certification authority, after a period of use, the temperature of that area can be adjusted so as to melt the surrounding ice and expose the area to be inspected. Following inspection, the ice composite body can be repaired, if necessary and the area of the core refrozen.

Suitably, an individual refrigerant pipe can be removed from the ice core for repair or replacement.

Thus, an individual pipe can be relined or replaced if needed. This can be achieved by raising the temperature of the pipe so as to free it from the surrounding ice.

In a further embodiment the ice composite body has means for utilising any waste heat generated by the refrigeration unit for heating any buildings located on the ice composite body.

Using the waste heat in this fashion has the advantage not only of providing a cheap source of heat for the buildings but also a profitable method of removing the waste heat from the area of the ice core thus increasing the efficiency of the system.

Suitably, the ice composite body has a backup refrigeration unit.

Different groups of pipes can be usefully connected to primary, secondary or tertiary backup refrigeration systems, powered by different power systems, to increase the level of reliability and security to a level specified by the certification authority, for the use for which the ice composite body is commissioned.

Preferably, the backup refrigeration unit can be used to cool any buildings located on the ice composite body.

Using the backup refrigeration unit in this way makes economic use of the unit which might otherwise remain idle for prolonged periods of time.

Preferably, the ice core is formed from degassed or deionised water.

The use of degassed or deionised water results in the formation of an ice core hang predictable properties.

In a further embodiment the ice composite body further comprises a set of supporting piles, each pile being adapted for fixing to a waterbed at one end thereof, the other end being accommodated in cells constructed within the protective outer shell, the body being free to move in a vertical direction relative to the piles, in response to changing water levels or buoyancy of the body, but not horizontally.

This method of fixing the ice composite body in place means that the piles only need to restrain the body laterally and do not have to support the weight of the body, as it floats in the water.

The ice composite body can also be fixed to the bed using rigid supports fixed to the body. The buoyancy of the ice composite body can be adjusted so that the supports only have to bear a small proportion of the weight of the body.

In both cases the ice composite body is not fixed directly to the water bed and thus the bottom of the body can be inspected if required.

In another aspect, the invention encompasses a process for the construction of an ice composite body as hereinbefore defined comprising the steps of constructing a protective outer armour shell having a base section and side sections, building up an inner ice core within the protective armour shell by successively freezing sufficient amounts of water to form layers of ice, rolling each successive layer of ice with a rolling apparatus to provide a roller pressure in the range of 3.5 to 8 Newtons/mm², locating a plurality of refrigeration pipes within the body during the ice forming stage, and locating a separate top section of the protective outer armour shell on the top of the completed inner ice core and between the side sections, such that the top section is free to move vertically.

An ice composite body produced in accordance with the above process will contain an inner ice core having a compressive strength of up to 8 Newtons/mm², with a yield strength for extreme impact loading over short periods of time of 20 Newtons/mm², an average composite surface bearing strength of up to 8 Newtons/mm² of surface in total and a local bearing capacity equal to that of the top section used, typically 50 Newtons/mm² for an armour shell made from concrete material.

Preferably, the protective outer armour layer is constructed in the form of an inner wall and an outer wall with a space therebetween.

An ice composite body having a protective outer armour shell constructed in the form of an inner and outer wall will have an inner ice core, which is only stressed in compression. This will result in an increase in safe design strength up to 8 Newtons/mm². The physical constraining of the ice along the three orthogonal axes results in ultimate yield strength of the ice of up to 20 Newtons/mm² for short duration stresses such as in collisions or during a fifty-year wave, thereby increasing the industrial usefulness of ice as an engineering material.

Further, preferably, the space between the inner and outer walls is filled with an insulating material.

Advantageously the filling material is foam insulation.

In one embodiment of the process in accordance with the invention, as each successive amount of water is being frozen to form a layer of ice, the central section of the layer is maintained above freezing point by use of a heating means, and once the remainder of the ice layer has been formed the heating means is removed and the centre portion of the ice layer is frozen.

By using a heating means in this fashion most of the stress due to the lateral expansion of the ice layer is eliminated.

Preferably, the inner surface of the inner wall is coated with a flexible material prior to forming the ice core.

By coating the inner surface of the inner wall with a suitable flexible material any stresses due to the expansion of the central section of the ice layer, following removal of the heating means, can be minimised.

Further, preferably, the flexible material is bitumen.

Suitably, the plurality of refrigeration pipes is arranged in parallel groups at various levels throughout the ice core and adjacent layers of pipes are positioned at an angle relative to each other.

Preferably, the adjacent layers of refrigeration pipes are positioned at right angles to each other.

Further, preferably, a group of refrigeration pipes is located between each layer of ice.

Positioning the refrigeration pipes in this fashion is straightforward and the resulting ice core can be easily maintained in the desired condition.

Suitably, a filler material is added to the space between the top section and the side sections.

Advantageously, a stuffing gasket is located at the upper end of the space between the top section and the side sections.

In a further embodiment of the process in accordance with the invention, the top section is located on top of the inner core by immersing a partially completed body in water and floating the top section into position on the ice core.

Preferably, the top section is floated over a side section of the armour shell, having first removed an upper edge thereof, the upper edge being placed in position once again following correct location of the top section on the ice core.

The step of floating the top section into position allows the top section to be correctly positioned without leaving a gap between the top section and the top of the ice core.

The invention will be further illustrated by the following description of embodiments thereof, given by way of example only with reference to the accompanying drawings.

MODES FOR CARRYING OUT THE INVENTION

Figure 1:
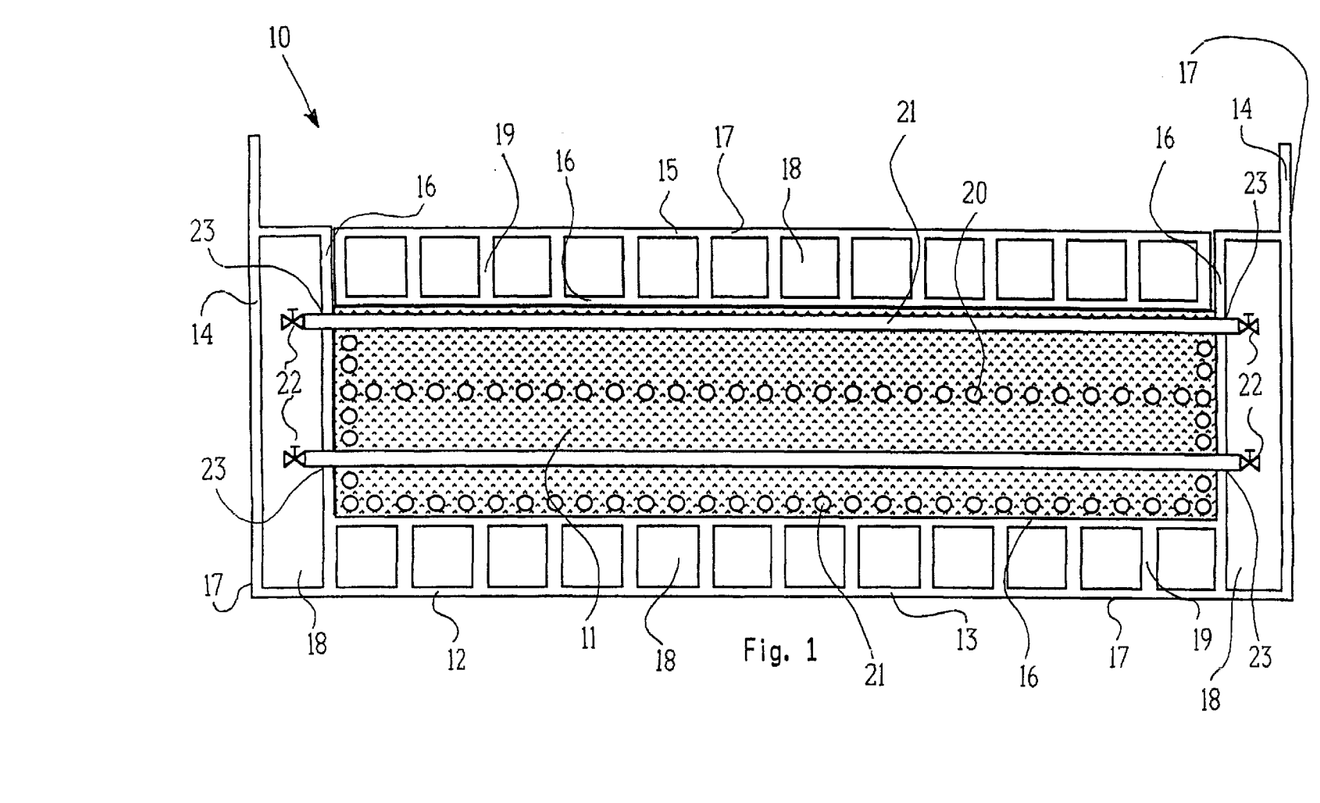
FIG. 1 is a is a transverse section of a first embodiment of an ice composite body according to the invention.

Referring to FIG. 1 there is indicated, generally at 10, in transverse section, an ice composite body according to the invention for use in the construction of fixed or floating structures located in or on water. The body 10 has an inner ice core 11, and a protective outer armour shell 12. The protective outer armour shell 12 is made from concrete material. The type of construction in concrete used is based on the method of construction of the hull of the tanker vessel "Selma" as described by Wig, Rudolph, American Society of Naval Architects, November, 1919, and referred to in detail by Turner, Colin W. R., Sea Breezes 1996, 936–944.

The protective outer armour shell 12 consists of a base section 13, side sections 14 and a separate top section 15. The top section 15 rests on the inner ice core 11 and is flee to move vertically between the side sections 14. The outer armour shell 12 has an inner wall 16 and an outer wall 17, defining a space 18 therebetween which acts as a means for thermally insulating the inner ice core 11. The space 18 is filled with foam insulating material (not shown). Strengthening ribs 19 are located at intervals between the inner wall 16 and the outer wall 17 of the base section 13 and the top section 15.

The body 10 also has means 20 for maintaining the ice core 11 in a frozen condition in use, in the form of a plurality of refrigeration pipes 21. The refrigeration pipes 21 pass through the inner walls 16 of the side sections 14 and are connected by valves 22 to a suitable refrigeration unit (not shown) located in the space 18. The refrigeration pipes 21 are located in parallel groups at various levels throughout the ice core 11, with adjacent groups of pipes 21 dispersed at right angles to each other.

The refrigeration pipes 21, where they pass through the inner walls 16 at points 23, are fixed with suitable fixing means and this adds to the transverse strength of the body 10.

Figure 2:
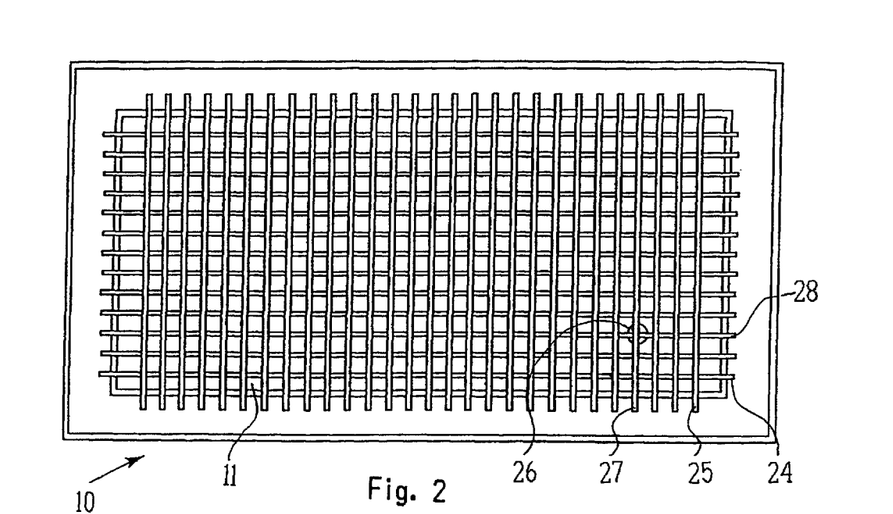
FIG. 2 is a plan view of the ice composite body of FIG. 1.

Referring to FIG. 2, which is a plan view of the ice composite body 10 of FIG. 1, with the top section 15 removed, two sets of parallel refrigeration pipes 24,25 are shown which are orientated at right angles to each other. By using a suitable system of power source, refrigerant and control of the refrigerant flow, not shown, to individual pipes, any part of the inner ice core 11 can be kept at a suitable temperature. Thus, if it is desired to preferentially remove heat from a section 26 of the inner ice core 11, then individual pipes 27, 28 at the levels above and below the section 26 can be supplied with a greater quantity of refrigerant or refrigerant at a lower temperature than that supplied to other parts of the inner ice core 11.

Figure 3:
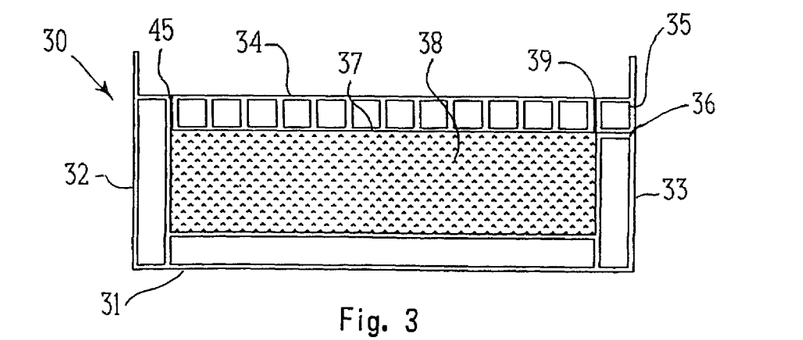
FIG. 3 is a transverse section of a second embodiment of an ice composite according to the invention.

Referring to FIG. 3 there is indicated, generally at 30, a transverse section of a second embodiment of an ice composite body according to the invention. The refrigeration pipes have been omitted from this figure for clarity. As before, the body 30 comprises a base section 31, side sections 32, 33 and a separate top section 34.

The side section 33 has a separate closure section 35, which is removably located on upper edge 36 of side section 33. The closure section 35 is removed during construction of the ice composite body 30 to allow the top section 34 to be positioned on top 37 of an inner ice core 38. Once the top section 34 is in position the closure section 35 is repositioned on the upper edge 36 of side section 33.

Figure 4:
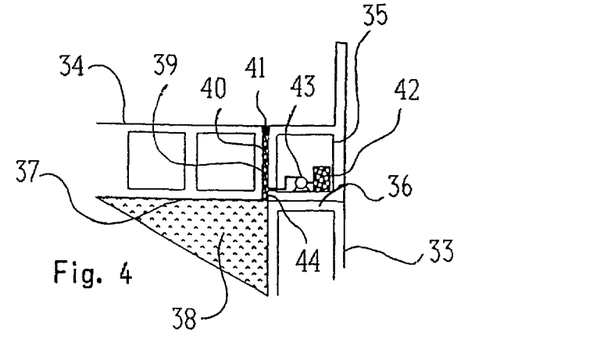
FIG. 4 is an enlarged section of a separate closure section of the ice composite body of FIG. 3.
Figure 5:
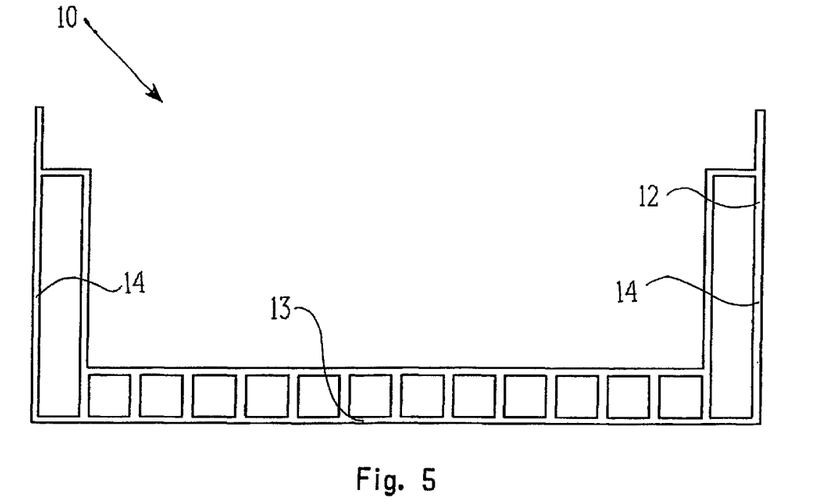
FIG. 5 is a transverse section of the base and side sections of the ice composite body of FIG. 1.

In FIG. 4 the separate closure section 35 is shown in more detail. A space 39 between the separate closure section 35 and the top section 34 is shown filled with a filler material 40. This filler material 40 prevents any ice from the inner ice core 38 from entering the space 39, in use. The filler material 40 is an elastomer-modified bitumen. A stuffing gasket 41, located at upper end of the space 39, prevents the filler material from being lost from the space 39.

A reservoir 42 for the filler material 40 is located in the separate closure section 35. The reservoir 42 is connected through pump 43 to the space 39. Thus, any filler material 40, which is lost from the space 39 is replaced by pump 43, which slowly feeds filler material 40 from the reservoir 42 to base 44 of the space 39, at a pressure equal to the compression stress on the top section 37 of the inner ice core 38, to prevent any migration of the ice core 38 and to ensure that the space 39 is always full of filler material 40.

A similar arrangement (not shown), ensures that corresponding space 45 (FIG. 3), between the side section 32 and the top section 34, is also kept full of filler material 40.

Referring to FIGS. 1 and 5–7, a method of constructing the ice composite body 10 of FIG. 1 is described. Thus, the first step is the construction of the outer armour shell 12 from concrete material (FIG. 5), using a suitable mould. The base section 13 and side sections 14 are assembled. A permanent gas barrier plastics film (not shown) is placed on the surfaces of the concrete sections 13, 14 to maintain the desired humidity during concrete curing, to ease separation of the outer armour shell 12 from the mould after curing and also to act, in use, as a gas barrier to prevent gas from diffusing into the inner ice core 11, once constructed.

Figure 6:
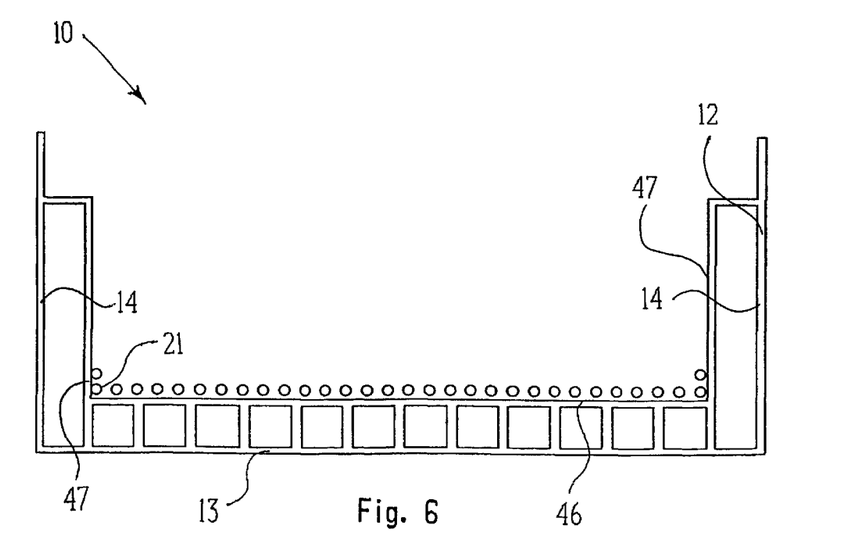
FIGS. 6 and 7 are transverse sections of the ice composite body of FIG. 1 showing successive stages in the construction thereto.

The next step is to locate a first set of refrigeration pipes 21 on inner surface 46 of the base section 13 and partway along inner surfaces 47 of side sections 14 (FIG. 6).

Next the inner ice core 11 is built up by freezing a succession of thin layers of ice one by one, and by rolling each layer once it has been frozen. This results in a high proportion of the strongest crystal axes being aligned perpendicular to the horizontal plane, across which the ice is stressed in compression and with most crystal basal planes best orientated to resist compression.

Thus, a first amount of water is added into the body 10. The water should be at its freezing point and should contain pre-formed ice crystals, care being taken to prevent gas from being entrained in or from being dissolved in the water. This first layer of water is then frozen by using cold gas from above and the refrigeration pipes 21.

Stresses due to the lateral expansion of the ice layer are eliminated by using a movable heating means with an insulated base (not shown), which keeps a central section of the water liquid as the ice layer expands laterally, until the first ice layer is complete except for the space occupied by the heating means. The heating means is then removed and the space it occupied is filled with an additional quantity of water, which is then frozen. For this last step, stresses due to expansion of the small central section of the ice layer formerly occupied by the heating means, are dealt with by coating the inner surface 47 of the outer armour shell 12 with bitumen, which will adsorb these stresses.

Figure 7:
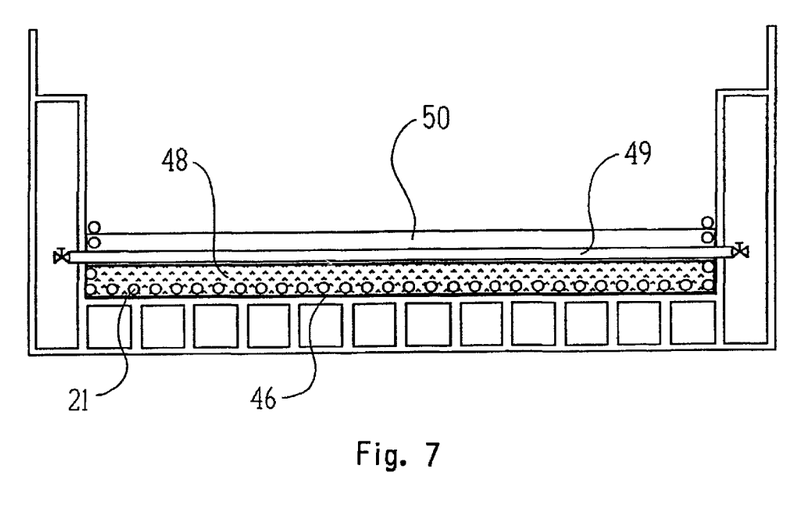

Referring to FIG. 7, the frozen layer of ice 48 is then rolled in order to orient the strongest axes of the ice crystals of the ice formed in the desired direction. A suitable roller apparatus is used, which will exert a compressive pressure above that of the weak ice crystals and below that of the strong ice crystals, i.e. typically a roller pressure in the range 3.5 to 8 Newtons/mm$^2$, with the choice of roller pressure being determined by the particular core strength required by the designer. This rolling process converts the crystal structure in the first ice layer into one with the required mix of strong crystals of known orientation and compressive strength. This ensures that any average load on the top section, in use, which is below the pressure exerted by the roller, can be safely withstood by the ice composite body.

When the rolling step of the first ice layer 48 has been completed, a further layer of refrigeration pipes 49 is added at right angles to the first layer of pipes 21 on the inner surface 46 of the base section 13. A further amount of water 50 is added and the freezing and rolling steps are repeated. Thus, the inner ice core 11 (FIG. 1) is gradually built up from a succession of thin ice layers, frozen to each other, which have been individually rolled. As the inner ice core 11 is built up further layers of refrigeration pipes 21 are added, with adjacent layers being at right angles to each other. Also, as the inner ice core 11 is built up, temperature, pressure and strain sensors (not shown) are also placed in it at regular intervals to measure the conditions in use to which the ice composite body 10 is subjected.

Once the inner ice core 11 has been completed temperature, pressure and strain sensors (not shown) are placed on top at intervals to measure the conditions in use to which the top of the inner ice core 11 is subjected. The separate top section 15 of the outer armour shell 12 is then placed in position on top of the inner ice core 11 between the side sections 14 (FIG. 1).

Figure 8:
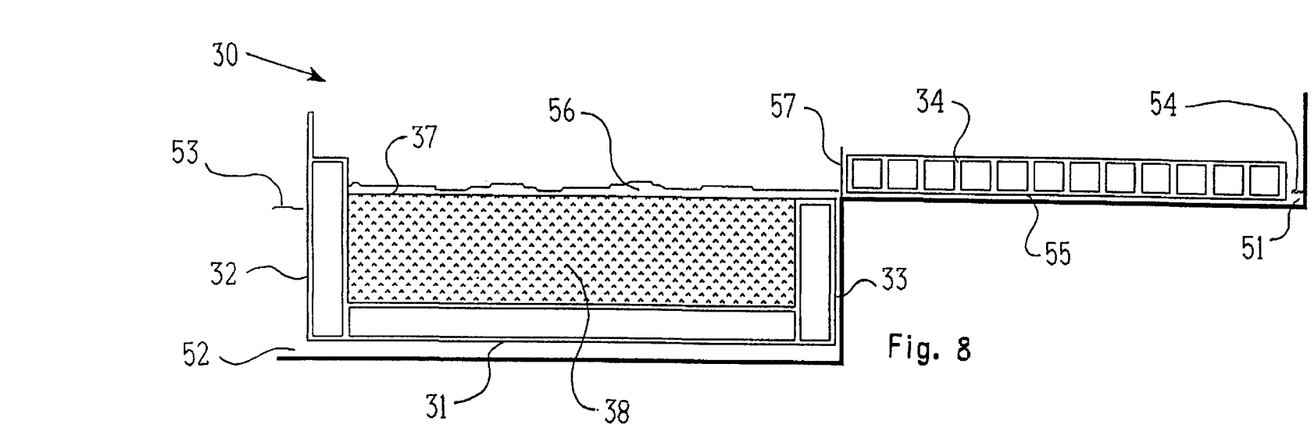
FIGS. 8 and 9 are transverse sections of the ice composite of FIG. 2 showing the stages in the positioning of the top section.
Figure 9:
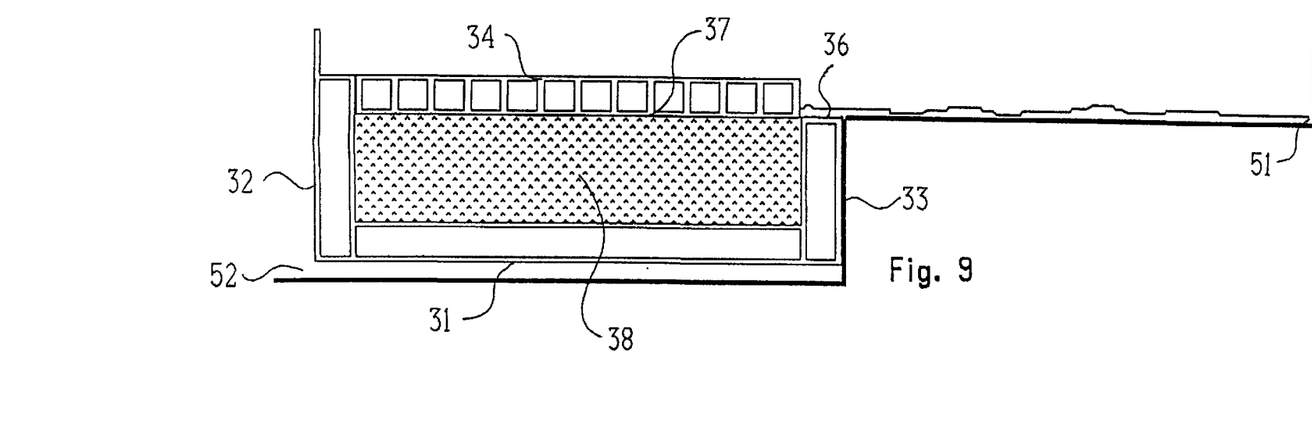

Referring to FIGS. 8 and 9, a method of positioning the top section 34 of the ice composite body 30, as illustrated in FIG. 3, is illustrated. The top section 34 is made separately and floated into its position. First the top section 34 is floated in a dock 51. Then the ice composite body 30, to which it is to be added, is floated in a deeper water dock 52, the water level 53 of which is lower than the water level 54 in dock 51.

The separate closure section 35 has been removed from the upper edge 36 of the side section 33. The body 30 is positioned in the dock 52 so that it tightly abuts the dock 51 and is aligned line abreast with the top section 34. The water level 54 of dock 51 is maintained by the addition of water. The top 37 of the inner ice core 38 is held at a level slightly below that of base 55 of the top section 34. When they are properly aligned the space above the top 37 of the inner ice core 38 is filled with water 56 at 0° C. to the same level 54 as the level in the dock 51. Gate 57 is then lifted and the top section 34 is floated into position on top of the inner ice core 38 (FIG. 9).

When the top section 34 is in position the thin layer of water on the top 37 of the inner ice core 38 is frozen. The separate closure section 35 is repositioned on the upper edge 36 of the side 33. Any remaining water is cleared away from the spaces between the top section 34 and the side sections 32, 33 and these spaces are filled with a suitable filler material, as described above.

Figure 10:
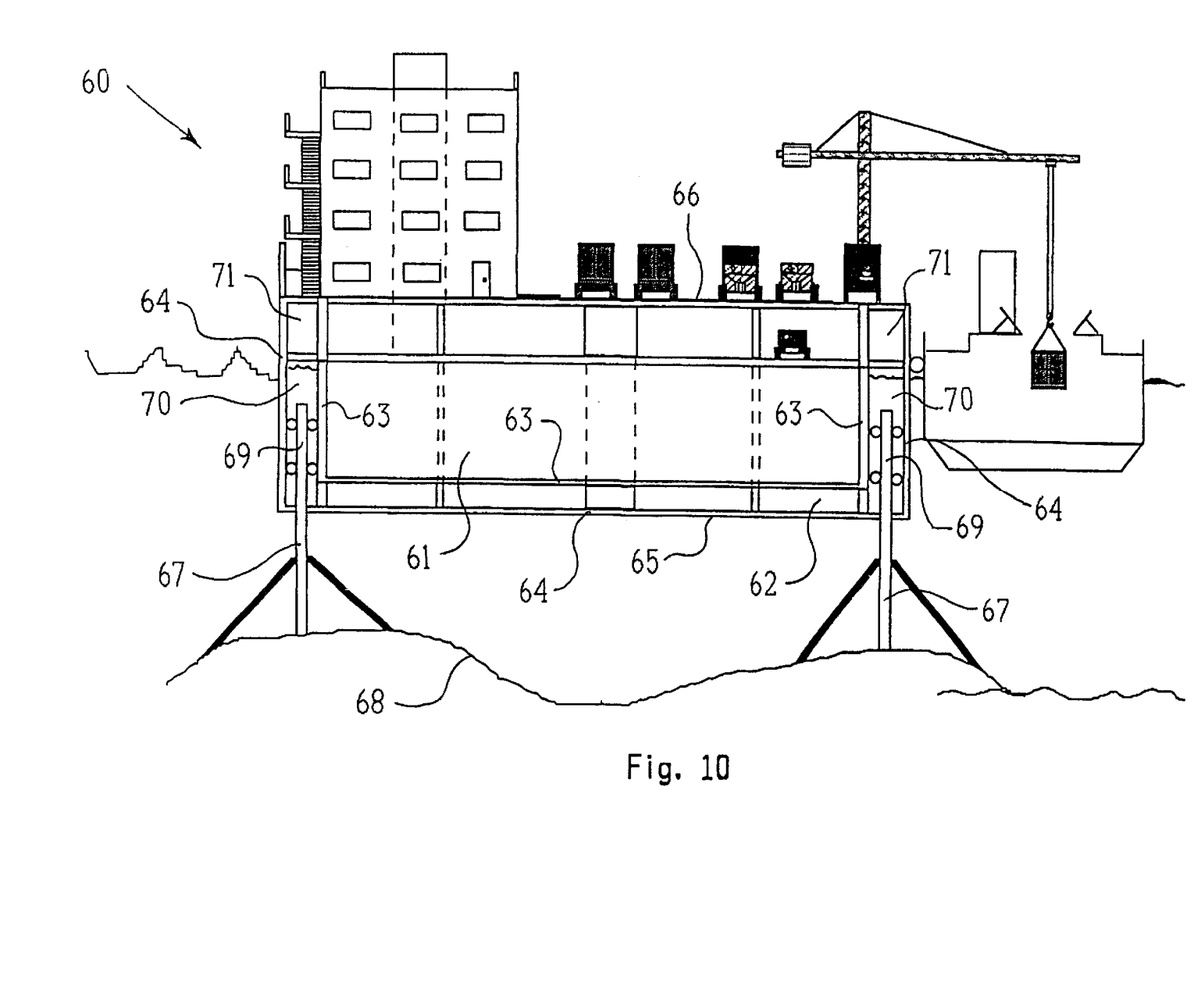
FIG. 10 is a representation of a breakwater constructed from ice composite bodies according to the invention.

Referring to FIG. 10 there is illustrated, generally at 60, a breakwater constructed from ice composite bodies according to the invention. The breakwater 60 is fully floating. The lower density of an inner ice core 61, when compared to the surrounding water, together with an air space 62 between an inner wall 63 and an outer wall 64 of an outer armour shell 65 results in the desired level of buoyancy. The double walled construction of the outer armour shell 65 also means that any rainfall or other material spilled on a top surface 66 of the breakwater 60 can be captured and treated to an environmental regulator's requirements, before release to the environment.

The breakwater 60 is held in position by piles 67, which are fixed to a waterbed 68. Upper parts 69 of the piles 67 are enclosed in cells 70, within the space 62 between the inner wall 63 and the outer wall 64 of side sections 71. The breakwater 60 is free to rise and fall with the water level, as the piles 67 are not fixed thereto. Because of this freedom the piles 67 do not have to bear any of the weight of the breakwater 60, or of any of the structures built thereon. Thus, the breakwater 60 does not have to be grounded to the waterbed in order to remain in place, with consequent safety benefits particularly in earthquake prone areas. The strength of the piles 67 can thus be used exclusively for holding the breakwater on location, preventing lateral movement thereof. The piles 67 can be buttressed and mooring cables used, as necessary.

Figure 11:
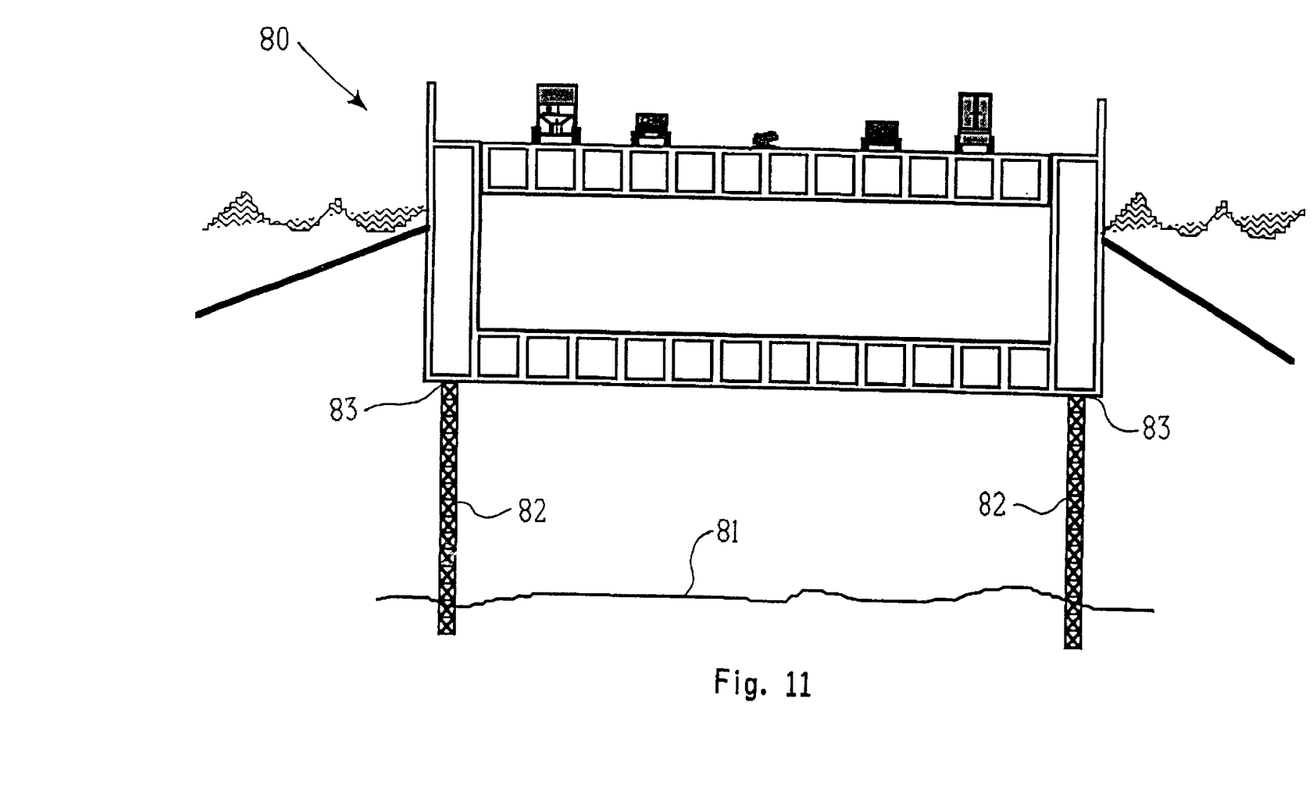
FIG. 11 is a representation of a motorway constructed from ice composite bodies according to the invention.

Referring to FIG. 11 there is illustrated, generally at 80, a transverse section of a motorway constructed from ice composite bodies according to the invention. In this case, the motorway 80 is fixed to a waterbed 81 by piles 82, which are attached to the motorway 80 at points 83. The dimensions of the ice composite bodies, used in the construction of the motorway 80, are chosen so that the motorway 80 is buoyant and thus, the piles 82 only have to bear the weight due to any net negative buoyancy of the motorway 80, which is at a minimum at high water. The strength of the piles 82 can thus be used for holding the motorway on location, using buttressing of the piles 82 and mooring cables, as required.

What is claimed is:

1. An ice composite body for use in the construction of fixed or floating structures located in or on water, the body comprising an inner ice constrained core, a protective outer armour shell having side sections and a separate top section, the top section resting freely between the side sections on the ice core in use and being free to move vertically in use, such that any load acting on the top section will be evenly distributed through the body, means for thermally insulating the ice core and means for maintaining the ice core in a frozen condition in use.

2. An ice composite body according to claim 1, wherein the protective outer armour shell has an inner wall and an outer wall with a space therebetween, the space providing the means for thermally insulating the ice core.

3. An ice composite body according to claim 1, wherein the space is filled with foam insulating material.

4. An ice composite body according to claim 1, wherein strengthening ribs are located at intervals between the inner and outer walls.

5. An ice composite body according to claim 1, wherein the protective outer armour shell has a base section, side sections, and the top section is located between the side sections and is free to move therebetween.

6. An ice composite body according to claim 5, wherein one of the side sections further comprises a separate closure section removably located on the upper edge thereof, the closure section being located on the side section in use once the top section is in position.

7. An ice composite body according to claim 5, wherein the space between the top section and the side sections contains a filler material, which prevents any of the core ice from entering the space in use.

8. An ice composite body according to claim 7, wherein the filler material is an elastomer or an elastomer-modified bitumen.

9. An ice composite body according to claim 7, wherein a stuffing gasket is located at the upper end of the space between the top section and the side sections to limit the loss of filler therefrom.

10. An ice composite body according to claim 7, further comprising means for replacing any filler lost from the space.

11. An ice composite body according to claim 1, wherein the protective outer armour layer is made of concrete material.

12. An ice composite body according to claim 1, wherein the inner ice core is formed in layers, each layer having been rolled using a roller apparatus which provides a roller pressure in the range of 3.5 to 8 Newtons/mm$^2$ following formation thereof.

13. An ice composite body according to claim 1, wherein the means for maintaining the ice core in a frozen condition in use is a plurality of refrigeration pipes passing through the ice core, the refrigeration pipes being connected to a refrigeration unit.

14. An ice composite body according to claim 13, wherein the plurality of refrigeration pipes is arranged in parallel groups at various levels throughout the ice core.

15. An ice composite body according to claim 14, wherein adjacent groups of refrigeration pipes lie at an angle relative to each other.

16. An ice composite body according to claim 15, wherein adjacent groups of refrigeration pipes lie at right angles to each other.

17. An ice composite body according to claim 13 wherein a parallel group of refrigeration pipes is located between each layer of ice, wherein the inner ice core is formed in layers, each layer having been rolled using a roller apparatus which provides a roller pressure in the range of 3.5 to 8 Newtons/mm² following formation thereof.

18. An ice composite body according to claim 13, wherein the plurality of refrigeration pipes includes a set of parallel pipes along the inner wall of each side section.

19. An ice composite body according to claim 13, wherein the refrigeration unit is located within the space between the inner and outer walls of the protective armour shell.

20. An ice composite body according to claim 13, wherein each refrigerant pipe passes through opposing inner walls of the side sections of the protective armour layer and is secured within the space between the inner and outer walls.

21. An ice composite body according to claim 13, wherein the temperature of individual refrigerant pipes can be controlled independently.

22. An ice composite body according to claim 13, wherein an individual refrigerant pipe can be removed from the ice core for repair or replacement.

23. An ice composite body according to claim 13, having means for utilizing any waste heat generated by the refrigeration unit for heating any buildings located on the ice composite body.

24. An ice composite body according to claim 13, having a backup refrigeration unit.

25. An ice composite body according to claim 24, wherein the backup refrigeration unit can be used to cool any buildings located on the ice composite body.

26. An ice composite body according to claim 1, wherein the ice core is formed from degassed or deionised water.

27. An ice composite body according to claim 1, further comprising a set of supporting piles, each pile being adapted for fixing to a waterbed at one end thereof, the other end being accommodated in cells constructed within the protective outer shell, the body being free to move in a vertical direction relative to the piles, in response to changing water levels or buoyancy of the body but not horizontally.

28. A process for the construction of an ice composite body according to claim 1, comprising the steps of constructing a protective outer armour shell having a base section and side sections, building up an inner ice core within the protective armour shell by successively freezing sufficient amounts of water to form layers of ice, rolling each successive layer of ice with a rolling apparatus to provide a roller pressure in the range of 3.5 to 8 Newtons/mm², locating a plurality of refrigeration pipes within the body during the ice forming stage, and locating a separate top section of the protective outer armour shell on the top of the completed inner ice core and between the side sections, such that the top section is free to move vertically.

29. A process according to claim 28, wherein the protective outer armour layer is constructed in the form of an inner wall and an outer wall with a space therebetween.

30. A process according to claim 29, wherein the space between the inner and outer walls in filled with an insulating material.

31. A process according to claim 30, wherein the insulating material is foam insulation.

32. A process according to claim 28, wherein as each successive amount of water is being frozen to form a layer of ice, the central section of the layer is maintained above freezing point by use of a heating means, and once the remainder of the ice layer has been formed the heating means is removed and the center portion of the ice layer is frozen.

33. A process according to claim 32, wherein the inner surface of the inner wall is coated with a flexible material prior to forming the ice core.

34. A process according to claim 32, wherein the flexible material is bitumen.

35. A process according to claim 28, wherein the plurality of refrigeration pipes is arranged in parallel groups at various levels throughout the ice core and wherein adjacent layers of pipes are positioned at an angle relative to each other.

36. A process according to claim 35, wherein the adjacent layers of refrigeration pipes are positioned at right angles to each other.

37. A process according claim 35, wherein a group of refrigeration pipes is located between each layer of ice.

38. A process according to claim 28, wherein a filler material is added to the space between the top section and the side sections.

39. A process according to claim 38, wherein a stuffing gasket is located at the upper end of the space between the top section and the side sections.

40. A process according to claim 28, wherein the top section is located on top of the inner core by immersing a partially completed body in water and floating the top section into position on the ice core.

41. A process according to claim 40, wherein the top section is floated over a side section of the armour shell, having first removed an upper edge thereof, the upper edge being placed in position once again followed correct location of the top section of the ice core.

42. An ice composite body according to claim 2, wherein the space is filled with foam insulating material.

43. An ice composite body according to claim 6, wherein the space between the top section and the side sections contains a filler material, which prevents any of the core ice from entering the space in use.

44. An ice composite body according to claim 8, wherein a to stuffing gasket is located at the upper end of the space between the top section and the side sections to limit the loss of filler therefrom.

45. A process according claim 36, wherein a group of refrigeration pipes is located between each layer of ice.

* * * * *